2,842,489
PRODUCTION OF SODA ASH

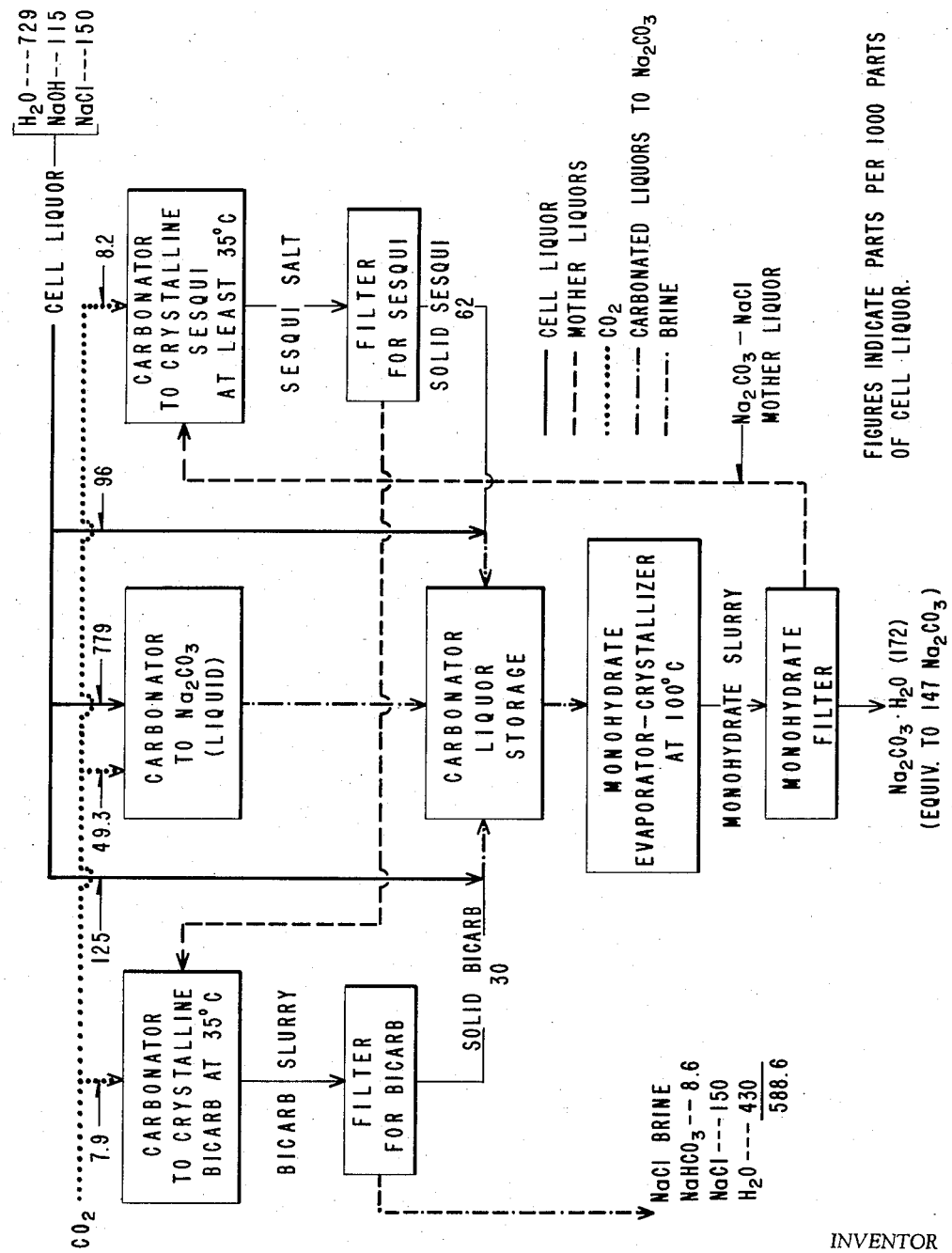

Hans Svanoe, Warren, Pa., assignor to Struthers Wells Corporation, Warren, Pa., a corporation of Maryland Application March 5, 1957, Serial No. 644,127

7 Claims. (Cl. 204—87)

This invention relates to the manufacture of soda ash from solutions of caustic soda obtained by the electrolysis of brine and more particularly relates to the recovery of sodium from cell liquor as soda ash and brine.

In the manufacture of caustic soda and chlorine by the electrolysis of sodium chloride solutions or brine using diaphragm cells efficient operation does not permit the conversion of more than about 50 percent of the sodium chloride content of the solution to sodium hydroxide. As a consequence of this incomplete conversion the direct product of the electrolytic operation, i. e., the cathode or so-called cell liquor is a solution containing about three parts by weight of sodium chloride to two parts by weight of caustic soda, a typical cell liquor made from saturated brine having approximately this composition:

1000 parts by weight of NaOH
1500 parts by weight of NaCl
7700 parts by weight of water plus, of course, minor amounts of impurities.

Various methods have been proposed and some used commercially for separating the caustic soda and NaCl from the cell liquor and returning the latter to the electrolysis. Of these methods one involves concentrating the cell liquor in a vacuum pot or other device, removing the NaCl deposited during the concentration, cooling the concentrated solution to about room temperature whereby NaCl is precipitated and the NaCl content reduced without substantial precipitation of caustic soda and then evaporating the solution to fusion. The caustic soda product so obtained, however, contains as much as 2% NaCl. By other methods the caustic soda has been converted to soda ash ($Na_2CO_3$) but such methods have not been as economical as desired because of expensive methods of carbonation to bicarbonate and decomposing this salt to produce soda ash, etc. The present invention provides a process whereby the difficulties encountered in the prior art processes are avoided, and total recovery of the sodium present remarkably improved by its conversion to soda ash and its recovery as brine.

An object of the present invention is to provide a process for the recovery of caustic soda, from cell liquors containing it by conversion to soda ash. Another object is to carbonate cell liquor in a plurality of steps to recover the caustic soda as soda ash and to return the sodium chloride to electrolysis. Yet another object is to separate the sodium from cell liquor as sodium carbonate monohydrate. Still another object is to carbonate cell liquor in stages, one to a sodium carbonate monohydrate stage, another to a sesquicarbonate stage and yet another to a sodium bicarbonate stage. Other objects and advantages of the invention will hereinafter appear.

In accordance with the invention I subject cell liquor, or caustic soda containing liquors of like salt content to carbonation, thereby converting the caustic soda to sodium carbonate monohydrate and the brine to concentrated brine, separate and dehydrate the sodium carbonate monohydrate to a dense soda ash, return the sodium chloride to the cell and repeat the cycle.

The invention will be more readily followed by reference to the flow sheet of the drawing which serves a dual purpose of illustrating a preferred embodiment and showing details of an example. The electrolysis of sodium chloride solutions of brine is not of this invention except that the cell liquor from such a process is a prime source of the liquor treated by the process of the invention. Such a liquor, or any liquor of like composition is carbonated in a suitable carbonator with carbon dioxide from any suitable source such as, and preferably, purified flue gas carbon dioxide from the well-known monoethanol amine scrubbing processes or the like.

First carbonation

A substantial part of the cell liquor is carbonated with $CO_2$ gas thereby converting the NaOH to $Na_2CO_3$ and this liquor is conducted to the carbonated liquor storage. This storage will essentially contain only sodium chloride and sodium carbonate and if the cell liquor is more concentrated than indicated above, some of the carbonate may be present as monohydrate. This liquor is then concentrated in an evaporator-crystallizer unit at a temperature above 50° C. to produce sodium carbonate monohydrate. This crystalline salt is separated in a filter and treated separately in the conventional manner to produce anhydrous dense soda ash.

Second carbonation

The mother liquor from the monohydrate filter is carbonated with $CO_2$ gas and at the proper temperature and concentration where the sesqui salt

$(Na_2CO_3.NaHCO_3.2H_2O)$ is the solid stable phase. This temperature should preferably be above 35° C. The sesqui is separated from the mother liquor in a filter and the solid sesqui is treated with an additional quantity of cell liquor to convert its bicarbonate content to soda ash according to the following reaction:

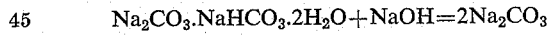
$Na_2CO_3.NaHCO_3.2H_2O+NaOH=2Na_2CO_3$

This mixture containing essentially only NaCl and $Na_2CO_3$ is then conducted to the common carbonated liquor storage.

Third carbonation

The mother liqour from the sesqui carbonation is carbonated with additional $CO_2$ gas to complete the conversion of the remaining $Na_2CO_3$ to bicarbonate. The bicarbonate produced is separated from its mother liquor in a filter and the solid bicarbonate is reacted with additional quantity of cell liquor to produce sodium carbonate and this mixture is conducted to the common carbonated liquor storage. High efficiency of this carbonation calls for treatment at a temperature of about 20 to 35° C. and carbonation is conducted close to the triple point where NaCl and $NaHCO_3$ are the solid stable phases. After filtration of the sodium bicarbonate the mother liquor which contains only a small amount of the bicarbonate, is essentially NaCl brine, is close to the saturation point on NaCl and is saturated on the bicarbonate at carbonation temperature. This mother liquor is returned to the cell house.

It should be noted that the liquor from the monohydrate evaporator-crystallizer unit can also be carbonated in one stage to produce bicarbonate, thereby eliminating the sesqui carbonation step; however, in so doing, the amount of cell liquor that can be carbonated directly to sodium carbonate (first carbonation) will be substantially reduced and the economics of such a process, while useful, will not be as favorable as carbonating the mother liquor in two steps (which means using three carbonation steps in all).

The example which follows is a preferred embodiment of the invention in which parts are by weight unless otherwise indicated:

One thousand parts by weight of cell liquor having the following approximate percentage by weight composition is carbonated:

| | |
|---|---|
| Sodium hydroxide (NaOH) | 11.5 |
| Sodium chloride (NaCl) | 15.0 |
| Sodium carbonate ($Na_2CO_3$) | 0.12 |
| Sodium sulfate ($Na_2SO_4$) | 0.44 |
| Sodium chlorate ($NaClO_3$) | 0.01 |
| Water | 72.93 |

The effect of the three last salt components in the cell liquor; that is, sodium carbonate, sulfate, and chlorate may be disregarded for this embodiment of the invention. An additional step can, if desired, be used to remove the sulfate, as the burkeite, a carbonate-sulfate double salt. However, this has no direct bearing on this aspect of the present invention.

As will be noted from attached diagram and as mentioned in the specification, this carbonation takes place in several steps. Note that on the flowsheet I have, by way of example only, indicated three steps, the sodium hydroxide content in the cell liquor being carbonated essentially to $Na_2CO_3$ as follows:

(1) 779 parts of the cell liquor is carbonated with $CO_2$ gas (either obtained from flue gas or purified flue gas) whereby the sodium hydroxide is converted to sodium carbonate. This carbonated liquor is conducted to carbonated liquor storage.

The carbonated liquor is then treated at a temperature of about 100° C. to produce sodium carbonate monohydrate in an evaporator-crystallizer; and the produced monohydrate is separated from its mother liquor in a filter or centrifuge.

(2) Mother liquor from sodium carbonate monohydrate evaporator-crystallizer unit is carbonated with $CO_2$ gas and to a point close to the triple point for sesquicarbonate and bicarbonate. (See Teeple "Industrial Development of Searles Lake Brines," page 118, point 154 on diagram 28). The sesquicarbonate crystals produced here are separated from its mother liquor on a filter and this solid sesqui is used to neutralize the NaOH in an equivalent amount of cell liquor and amounting to 9.6% of the total cell liquor input. In this way the NaOH contained in the cell liquor is converted to $Na_2CO_3$ and this mixture is also conducted to carbonated liquor storage.

(3) The mother liquor from the sesqui filter operation is carbonated with 7.9 parts $CO_2$ gas and the liquor maintained close to the equilibrium point where bicarbonate and sodium chloride are the solid stable phase (ibid., page 118, point 147, diagram 28). The bicarbonate so produced amounting to about 30.0 parts per 1000 parts cell liquor, is used to neutralize the last part of the cell liquor or close to 12.5% of the total amount of cell liquor input.

The result then is that all three carbonation processes discharge sodium carbonate-sodium chloride liquor to a storage tank. From this storage tank the combined liquors are conducted to an evaporator-crystallizer unit to produce sodium carbonate monohydrate.

The carbonation of mother liquor from the monohydrate filter can also be carbonated in one step to bicarbonate; however, this will mean that a substantial quantity of mother liquor will have to be converted to bicarbonate under difficult conditions and the quantity of cell liquor carbonated in the first step will be substantially reduced. This would be a decided disadvantage because equipment to carbonate cell liquor to $NaHCO_3$ is expensive and inefficient and one important advantage of the invention is to carbonate the maximum quantity of cell liquor directly to sodium carbonate.

*Production of sodium carbonate monohydrate*

The production of crystalline sodium carbonate monohydrate can take place at any convenient temperature at which the monohydrate is the solid stable phase. An important consideration is, however, that when the mother liquor from this monohydrate operation is used to produce solid sesqui as well as bicarbonate by carbonation, it is important to reduce the amount of mother liquor available. For instance, operating at 75° C. and at the triple point where sodium carbonate and sodium chloride are the solid stable phases, the amount of sodium carbonate in the mother liquor per 1000 parts of cell liquor is 79.5 parts; however, at the same triple point at 100° C., the equivalent figure of sodium carbonate per 1000 parts of cell liquor is only 64 (ibid., see equilibrium figures, pages 71 and 72, points 27 and 33 respectively). This mother liquor is then carbonated as indicated in steps 2 and 3 above.

The end products from the process are the following:

(a) 172 parts of $Na_2CO_3 \cdot H_2O$ per 1000. This monohydrate can then be treated in the conventional manner to produce dense soda ash of excellent quality, and (b) Sodium chloride brine close to saturation point on sodium chloride and saturated with sodium bicarbonate. The contained sodium bicarbonate can be used as an agent to purify additional quantities of brine which may be returned to the cell house.

*Water balance*

The cell liquor contains 729 parts of $H_2O$ per 1000 parts. Of this quantity 25 parts are removed with the monohydrate as water of crystallization, 430 parts removed in the brine and the remainder or 274 parts removed as vapor in the sodium carbonate monohydrate crystallizer and also removed in the carbonation processes by vacuum cooling or other means to utilize heat of reaction.

The example of the invention might be multiplied indefinitely but the foregoing is deemed to be sufficient to illustrate the principles involved in the invention and to enable one skilled in the art to select the preferred and optimum conditions for practical operation of the process under any chosen set of circumstances.

Moreover, the invention is not limited to any set of conditions as to temperature referred to in the example or to any specified number of carbonation steps. For example, the carbonation to $Na_2CO_3$ may be conducted at any suitable temperature and to a pH of about 12.5 or lower, the carbonation to sesquicarbonate between 35 and 80° C. preferably between 45 and 55° C. and the carbonation to bicarbonate between 20 and 80° C. and preferably between 35 and 80° C. which are also conducted until a pH of about 12.5 or lower is reached. Moreover, the proportion of carbonation in the stages may range through fairly wide limits although it is preferable to take the major amount of carbonation in the first and the minor amount of carbonation in the second and third stages, the preferred range being 50 to 80% in the sodium carbonate stage and between 5 and 25% in the other stages. If but two stages are used, i. e. only the carbonation to sodium carbonate and carbonation to sodium bicarbonate, the major carbonation i. e. from 50 to 80% is effected preferably in the sodium carbonate stage and the remainder in the sodium bicarbonate stage.

Modifications of the process of the invention, and various types of equipment may be used therein without departing from the invention or sacrificing of its many advantages and commercial usefulness.

I claim:
1. In a process for the conversion of cell liquor to soda ash and concentrated brine the steps which comprise converting cell liquor from the electrolysis of brine with carbon dioxide to sodium carbonate monohydrate and concentrated brine in three stages and separating from those stages sodium carbonate monohydrate, sesquicarbonate and sodium bicarbonate, using crystallization of sesquicarbonate and sodium bicarbonate to effect the conversion to the sodium carbonate monohydrate, concentrating the brine, separating the sodium carbonate monohydrate recovering the brine.

2. The process of claim 1 in which the three carbonation stages are conducted by reacting stoichiometrically 50 to 80%; 5 to 25%, and 5 to 25% of the sodium hydroxide present in the cell liquor with carbon dioxide to sodium carbonate.

3. A process for the treatment of cell liquor from electrolytic processes for chlorine manufacture wherein the sodium hydroxide is recovered by conversion to dense soda ash and the sodium chloride is returned to the electrolysis, which comprises carbonating and crystallizing the cell liquor and separating therefrom sodium carbonate monohydrate ($Na_2CO_3 \cdot H_2O$) in the first step, carbonating and crystallizing the mother liquor of the first step in a second step to sesquicarbonate $$(Na_2CO_3 \cdot NaHCO_3 \cdot 2H_2O)$$

carbonating and crystallizing in a third step the mother liquor of the second step to sodium bicarbonate ($NaHCO_3$) adding the sesquicarbonate from the second step and the sodium bicarbonate from the third step to the sodium carbonate monohydrate crystallization of the first step and returning the mother liquor of the final step to the electrolysis.

4. In a process for the conversion of cell liquor to soda ash and concentrated brine the steps which comprise converting cell liquor from the electrolysis of brine with carbon dioxide to sodium carbonate monohydrate and concentrated brine in two stages and separating from those stages sodium carbonate monohydrate and sodium bicarbonate using crystallization of sodium bicarbonate to effect the conversion to the sodium carbonate monohydrate, concentrating the brine, separating the sodium carbonate monohydrate recovering the brine.

5. In a process for the conversion of cell liquor to soda ash and concentrated brine the steps which comprise converting in the first step sodium hydroxide, of the cell liquor from the electrolysis of brine, with carbon dioxide to sodium carbonate monohydrate, reacting in the second step mother liquor from the first step with carbon dioxide to form sesquicarbonate $$(Na_2CO_3{-}NaHCO_3{-}2H_2O)$$

separating the sesquicarbonate from the carbonated liquor and converting the sesquicarbonate with cell liquor to sodium carbonate monohydrate, reacting in the third step the mother liquor of the second step with carbon dioxide to form sodium bicarbonate separating the sodium bicarbonate from the carbonated liquor and converting the sodium bicarbonate with cell liquor to sodium carbonate monohydrate combining and by heat converting the sodium carbonate monohydrate of each step to soda ash.

6. The process of claim 5 in which the sodium hydroxide content of cell liquor is carbonated to these extents: 50 to 80% by weight in the first and 5 to 25% by weight in the second and third steps.

7. The process of claim 6 in which the carbonation of the first step is conducted at a temperature above 50° C., in the second step above 35° C. and in the third step between 20° C. and 35° C.

References Cited in the file of this patent

UNITED STATES PATENTS 2,383,674     Osborne _____ Aug. 28, 1945